Nov. 25, 1969
V. J. CUSHING
3,479,871
ELECTROMAGNETIC FLOWMETER INCLUDING HUM COMPENSATION MEANS
Filed March 6, 1968
3 Sheets-Sheet 1
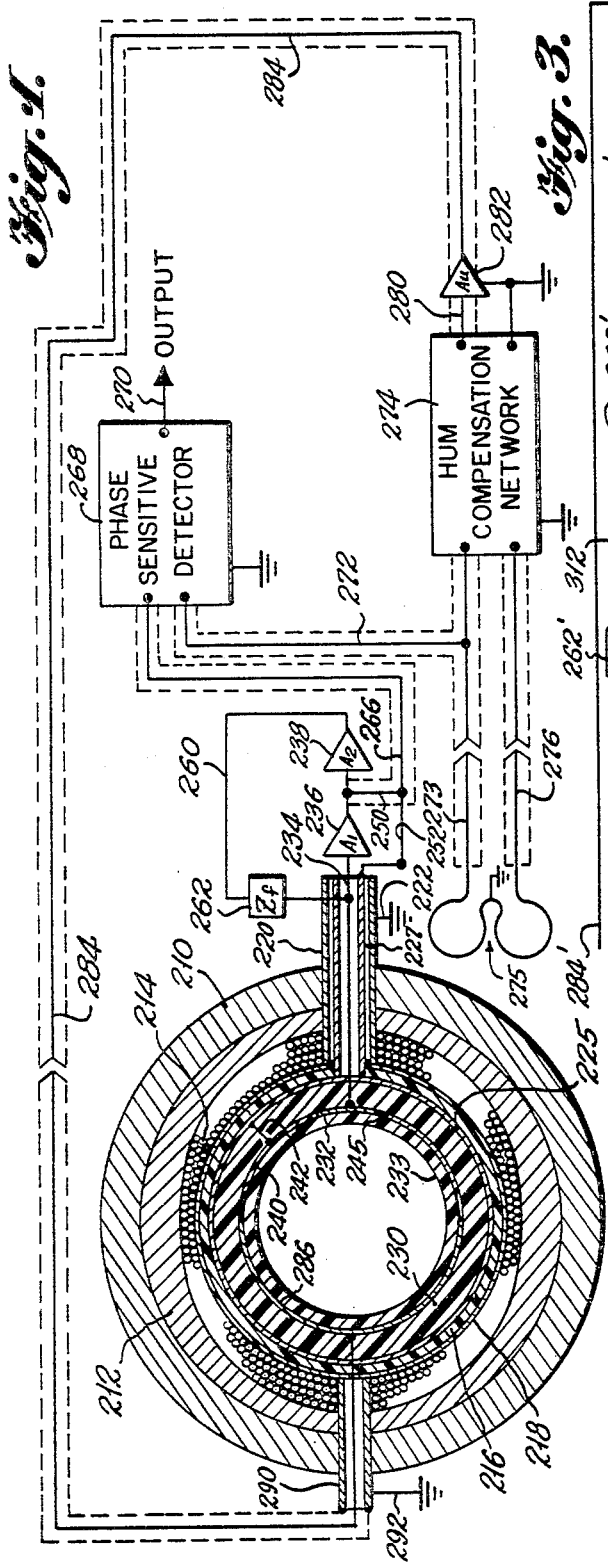
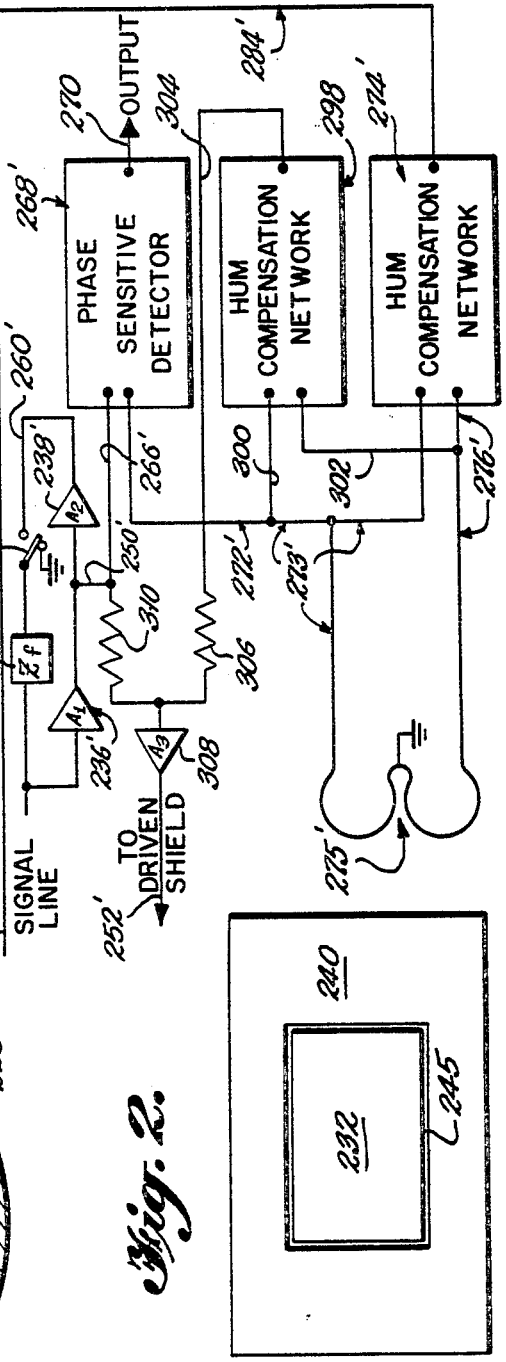
*INVENTOR*
VINCENT J. CUSHING
BY
*Shoemaker and Mattare*
ATTORNEYS

INVENTOR
VINCENT J. CUSHING

BY Shoemaker and Mattare
ATTORNEYS

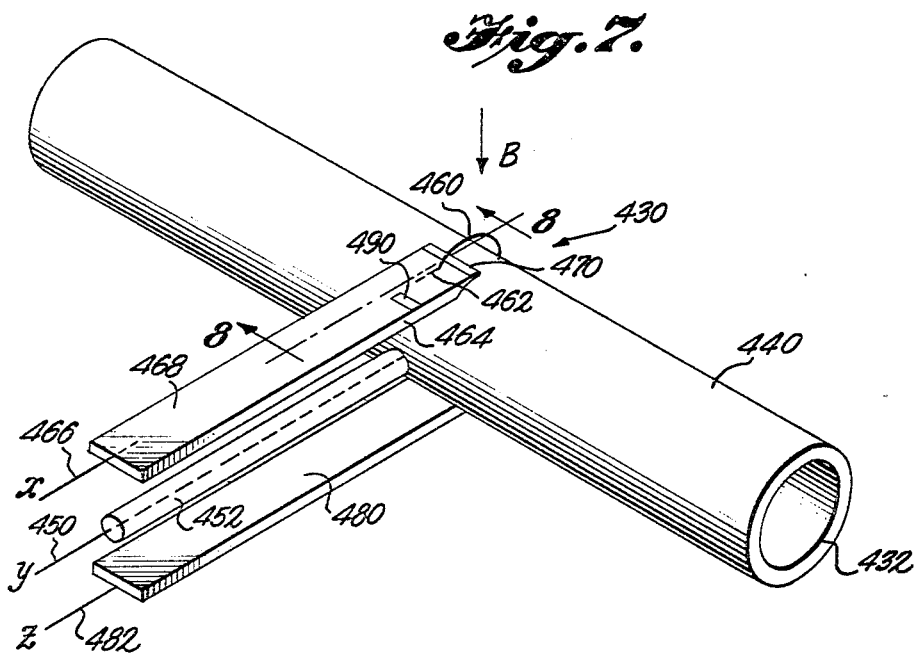
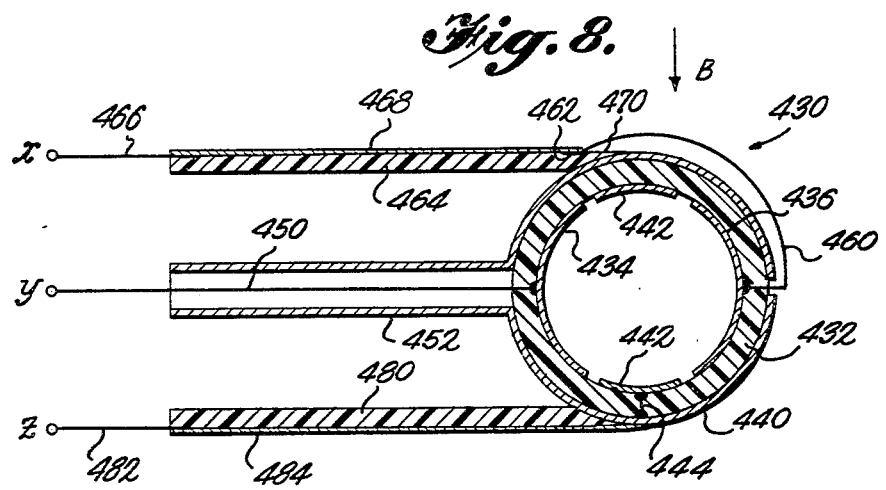

United States Patent Office 3,479,871
Patented Nov. 25, 1969

3,479,871
ELECTROMAGNETIC FLOWMETER INCLUDING
HUM COMPENSATION MEANS
Vincent J. Cushing, 9804 Hillridge Drive,
Kensington, Md. 20795
Continuation-in-part of application Ser. No. 558,484,
June 17, 1966. This application Mar. 6, 1968, Ser.
No. 717,063
Int. Cl. G01f 1/00
U.S. Cl. 73—194     15 Claims

ABSTRACT OF THE DISCLOSURE

Two detecting electrodes are disposed at opposite sides of a flow conduit, and a guard means including a third electrode is disposed adjacent to a high impedance electrode which is connected with a high impedance portion of the associated electrical network. An alternating magnetic field is produced within the flow conduit. In a first form of the invention, a first hum compensation voltage is impressed upon at least one of the electrodes and a second independent hum compensation voltage is impressed on another of said electrodes. In a second form of the invention, first, second and third lead means are connected with the high impedance detecting electrode, the low impedance detecting electrode and the guard means respectively, and means is provided for adjusting the lead means to control the amount of net flux threading the circuit loops including said lead means so as to provide substantially no net flux.

CROSS REFERENCE TO RELATED APPLICATIONS

The present application is a continuation-in-part of copending United States patent application Ser. No. 558,484 filed June 17, 1966, now abandoned, which in turn was a continuation-in-part of a copending United States patent application Ser. No. 449,930 filed Apr. 14, 1965, now U.S. Patent No. 3,274,831.

BACKGROUND OF THE INVENTION

The present invention relates to an electromagnetic flowmeter including hum compensation means, and more particularly to a flowmeter arrangement wherein the hum voltage sensed by the flowmeter is substantially reduced approximately to zero.

The present invention is an electromagnetic flowmeter employing an alternating magnetic induction in order to avoid polarization at the electrodes and to avoid stray potentials due to thermoelectric and electrochemical effects.

In this type of an arrangement wherein alternating magnetic induction is employed, serious "transformer effect" is encountered whereby alternating signals are induced in the flowmeter detection circuit because of the alternating flux threading this circuit.

The magnitude and phase of this stray pick-up, which is herein referred to as "hum," depend on the temperatures and characteristics of the metered fluid as well as the temperature and characteristics of the dielectric material of the tubular means through which the fluid is adapted to flow. Accordingly, the magnitude and phase of the hum may vary relative to the voltage sensed by the flowmeter due to the flow of fluid therethrough which obviously is a very undesirable effect.

In electromagnetic flowmeters which are employed with conductive fluids, the hum is found to be largely in time quadrature with the flow generated signal, and is found to be constant independent of the flow rate for a given flowmeter configuration. It has accordingly been found satisfactory to employ phase-sensitive detection of the flow generated signal and/or phase-sensitive suppression of the hum signal.

Such prior art hum elimination methods are not satisfactory in an electromagnetic flowmeter designed for use with low conductivity or dielectric fluids, and the present invention is especially adapted for use with such dielectric fluids and to provide effective hum compensation in this type of application.

SUMMARY OF THE INVENTION

In the flowmeter of the present invention, a relatively high impedance detecting electrode is provided. In addition, a second relatively high impedance detecting electrode or a relatively low impedance detecting electrode may be employed. Furthermore, additional components such as guard means and the like are employed in combination with said first-mentioned relatively high impedance detecting electrode. In accordance with one concept of the present invention, a hum compensation voltage of suitable magnitude is impressed upon each of the components as discussed hereinabove which have a significant electrical admittance within the flowmeter apparatus to said first-mentioned relatively high impedance detecting electrode. This added hum compensation voltage serves to null or cancel out the hum generated by the flowmeter so that the hum voltage sensed is very greatly reduced, approximately to zero, and this reduction is effective even when the electrical characteristics of the metered fluid and/or the electrical characteristics of the dielectric tubular means vary.

In the present invention, a guard means may be employed in combination with the detecting electrodes, this guard means including a shield means which is disposed directly outwardly of each of the detecting electrodes in order to minimize current losses from the detecting electrodes to ground to obtain accurate results for the apparatus. The guard means also includes a guard ring disposed about an associated detecting electrode and spaced substantially uniformly from the outer edges thereof for obviating the problem of so-called end-shorting, the guard ring and the shield means being electrically interconnected with one another and having a hum compensation voltage impressed thereon for canceling out the hum signal generated between the guard means and the associated high impedance detecting electrode.

In a modified form of the invention, the lead means connected with the high impedance detecting electrode, the low impedance detecting electrode and the guard means respectively are so arranged so that the lead means can be adjusted to control the amount of net flux threading the circuit loops including the lead means to provide substantially no net flux, thereby serving as an effective hum compensation means.

BRIEF DESCRIPTION OF THE DRAWINGS

FIGURE 1 is a somewhat schematic illustration of flowmeter apparatus according to the present invention;

FIGURE 2 is a view illustrating a detecting electrode and its associated guard ring in its developed or planar form;

FIGURE 3 is a schematic wiring diagram of a modified form of electrical network to be employed in the apparatus shown in FIG. 1;

FIGURE 7 is a top perspective view of a modified form of the invention; and

FIGURE 8 is a sectional view taken substantially along line 8—8 of FIG. 7 looking in the direction of the arrows.

DESCRIPTION OF THE PREFERRED EMBODIMENTS

Figure 4:
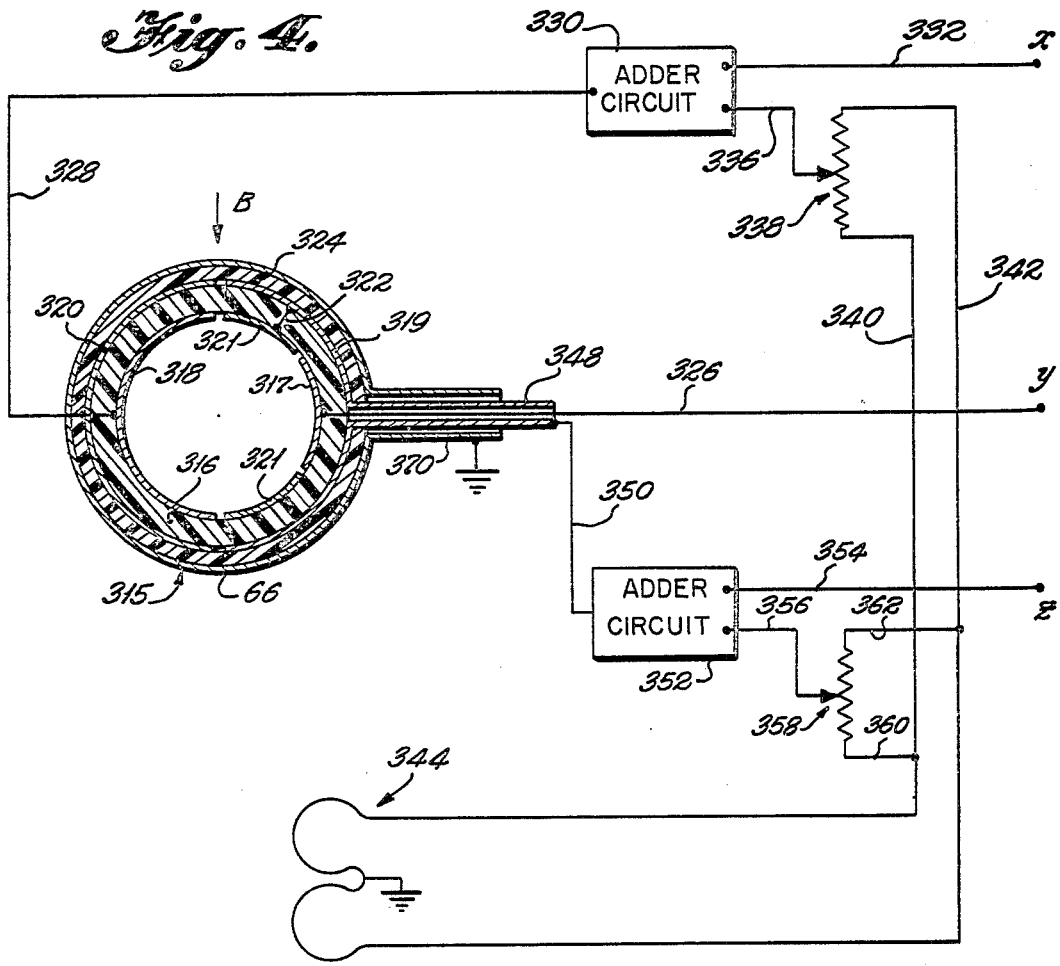
FIGURE 4 is a schematic illustration of a modified form of electromagnetic flowmeter according to the present invention.

Referring now to the drawings wherein like reference characters designate corresponding parts throughout, as seen in FIGS. 1 and 2, an outer casing or enclosure 210 surrounds a body of magnetic permeable material 212 which in turn is disposed about the magnet winding 214. It will be noted that the body of permeable material 212 may be contoured to maintain the inner surface of the body of permeable material 212 closely adjacent to the outer surface of the magnetic winding.

A tubular member 216 formed of suitable dielectric material such as fiberglass, plastic and the like supports a ground means 218 on the outer surface thereof, this ground means defining a substantially cylindrical configuration and preferably being formed either as a gridwork or as a thin metallic foil. Ground means 218 is connected with a cylindrical conductive portion 220 which forms the outer portion of a triaxial transmission line, portion 220 being connected with ground through a lead 222.

The shield means is indicated by reference numeral 225 and is disposed between the inner surface of member 216 and the outer surface of member 230, this shield means being preferably formed as a gridwork or as a thin sheet of metallic foil. The shield 225 is connected with the intermediate cylindrical portion 227 of the triaxial transmission line.

A tubular member 230 formed of suitable dielectric material such as fiberglass or the like is disposed inwardly of the tubular member 216, with the shield means 225 interposed between the two tubular members 230 and 216. The detecting electrode means includes a relatively low impedance electrode described hereinafter and an opposed relatively high impedance detecting electrode 232 which is disposed at the inner surface of tubular member 230 and which is interposed between this tubular member and the innermost tubular member 233. Member 233 is formed of suitable dielectric material such as Teflon, Mylar or the like, the liquid being adapted to flow through member 233, it being understood that member 233 may be eliminated if desired as, for example, where the metallic electrodes are chemically resistant to the metered fluid.

Detecting electrode 232 is connected to a line 234 which forms the innermost portion of the triaxial transmission line. Line 234 is in turn connected with the input of the first stage 236 of an amplifier means, the output of which is connected with a second stage 238.

Guard ring means 240 is interposed between tubular members 230 and 233, the guard ring means being connected with the shield means 225 through the intermediary of a lead 242. Referring now to FIG. 2, the developed or planar form of the detecting electrode 232 and the guard ring means 240 is illustrated. As seen in this figure, it will be noted that the detecting electrode 232 is substantially rectangular in configuration. The guard ring means 240 is also substantially rectangular and includes a central rectangular cutout portion which is slightly greater than the detecting electrode 232 so as to provide a clearance 245 all the way around the outer edges of the detecting electrode. Accordingly, when the two electrodes as seen in FIG. 2 are disposed in operative position, it will be understood that the guard ring means is disposed in spaced relationship with the detecting electrode and provides a substantially uniform spacing completely around the peripheral edge portions of the detecting electrode.

The output of the first stage 236 of the amplifier means is connected through a shielded lead 250 with a lead 252 which in turn is connected with the cylindrical member 227 connected with the shield means 225 which in turn through the intermediary of lead 242 is electrically connected with the guard ring means. The gain of the portion 236 of the amplifier means is unity, the shield means 225 as well as the guard ring means 240 being drive at unit gain from the output of portion 236 of the amplifier means. Accordingly, there is no flow-generated potential difference between the detecting electrode 232 and the adjacent guard means including the guard ring means and shield means, thereby eliminating the effect of the aforementioned fringe capacity and ground capacity.

For measurement of volumetric flow, as described in the aforementioned patent, the invention also employs regenerative feedback, and it will be noted that the output of portion 238 of the amplifier means is connected by means of a lead 260 through an impedance means 262 with the lead 234 connecting the detecting electrode to the input of the amplifier means. This arrangement provides a regenerative feedback path from the output of the amplifier means to the input thereof through the feedback impedance 262 which may in a typical example take the form of a high quality temperature stabilized capacitor. The proper gain setting of amplifier portion $A_2$ may be established in terms of flowmeter and amplifier circuit parameters which are entirely independent of the electrical properties of the fluid. With the gain setting suitably established, the detecting voltage is proportional to the flow-generated voltage and is independent of the electrical properties of the fluid. This very desirable operating feature is achieved by regeneratively feeding back into the flow detection circuit through the impedance $Z_f$ the output of the detection amplifier.

Thus for a certain gain setting $A_2$ the instrument provides an indication of the volumetric flow rate. But furthermore, it is found that the instrument can be made to indicate mass flow rate by selecting a different gain setting for $A_2$ as described later.

The amplifier means is also connected through a lead 266 with a phase-sensitive detector 268 which in turn has the output thereof connected through a lead 270 with a suitable output means.

The phase-sensitive detector means is in turn connected through a lead 272 with a lead 273 which in turn is connected with a hum compensation network 274. A lead 276 additionally connects the hum compensation network with a reference loop indicated generally by reference numeral 275 which is suitably disposed in the magnetic field of the transducer.

The output of the hum compensation network is connected through a lead 280 with a hum compensation amplifier 282 the output of which is connected through a lead 284 with detecting electrode 286 which is interposed between the tubular members 230 and 233. A tubular shield portion 290 is illustrated as being in surrounding relationship to the lead 284 extending outwardly from the compensation electrode 286. This shield means is in turn connected through a lead 292 with ground. It will further be noted that the various leads 266, 272, 273, 276, 280 and 284 are each illustrated as being surrounded by a suitable shield means as indicated by the dotted lines such that all of these leads are of a shielded wire configuration. This shield means may consist of sufficiently thin foil such that while the foil will serve as an excellent electrostatic shield, it will give rise to negligible eddy currents and disturbance to the magnetic field. This is especially important in shielding those portions of leads 234 and 284 which extend radially outwardly from the electrodes 232 and 286 respectively.

Referring now to FIG. 3, a modification of the invention is illustrated wherein a different form of an electrical network is provided for connection with the transducer portion of the apparatus.

The portions of the electrical circuit shown in FIG. 3 which are similar to that discussed in connection with FIG. 1 have been given the same reference numerals primed. It will be noticed that hum compensation network 274' is connected in substantially the same manner as hum compensation network 274, the output signal from this network being fed into the transmission line 284'. However, as seen in FIG. 3, an additional hum compensation network is indicated generally by reference numeral 298 and is also connected with reference loop 275' by means of leads 300 and 302. The output of network 298 is connected with a lead 304 which in turn is connected through a resistor 306 with the input of a driven shield buffer amplifier 308 the output of which is connected with lead 252' corresponding to lead 252 as seen in FIG. 1.

The output of amplifier portion 236' is connected through the intermediary of lead 250' with a resistor 310 so that the output of amplifier portion 236' is also fed to the input of the buffer amplifier 308.

The two resistors 306 and 310 form a rudimentary adder circuit, and if the two resistor values are equal, then the input to amplifier 308 is equal to one-half of the sum of the output of hum compensation network 298 and the output of the first stage amplifier 236'.

It will be noted that in this modified form of the invention, a hum compensation network is provided having a portion thereof operatively associated with the magnetic field of the apparatus and wherein the output of such hum compensation network is connected with the shield means.

With this arrangement, the hum compensation network automatically assures that the hum voltage is substantially nulled during all phases of operation regardless of changes in the hum voltage caused by changes in the electrical conductivity and the dielectric constant of both the tubular fluid conducting means as well as the metered fluid.

If resistors 306 and 310 are equal, then we require that $$A_1 A_3 = 2$$

in order that the shield means be driven at unit gain with respect to the flow-generated voltage. The virtue of the additional hum compensation means is that the compensation remains effective even if the dielectric properties of the flowpipe should change as for example when subjected to severe temperature changes. This additional hum compensation means is accordingly particularly valuable where the flow conduit is subjected to severe thermal shock.

As seen in FIG. 3, the feedback impedance 262' may be optionally attached by means of a selectively operable switch 312 to the output of amplifier portion 238', or to circuit ground when it is desired to measure mass flow.

Referring now to FIG. 4 of the drawings, the transducer portion of the apparatus is indicated generally by reference numeral 315 and is shown in cross section similar to the illustration of FIG. 1. The transducer portion includes a generally cylindrical tubular means 316 of dielectric material having the necessary dielectric and magnetic properties. This tubular means may be similar to that previously described. A pair of detecting electrodes 317 and 318 are provided, these electrodes being separate and electrically insulated from one another and disposed preferably at diametrically opposite inner portions of member 316. As illustrated, detecting electrodes 317 and 318 are suitably supported on the inner surface of member 316 and are in direct contact with fluid flowing through the tubular means. If desired, a thin liner of suitable dielectric material such as Teflon or the like may be provided inwardly of electrodes 317 and 318 and in concentric relationship with member 316.

The transducer portion includes guard means including a pair of shield means 319 and 320 each of which is disposed substantially directly outwardly of the associated detecting electrodes 317 and 318 respectively. In this modification, the two shield means are spaced from one another so as to be insulated from one another. These shield means as well as the detecting electrodes are formed of a suitable electrically conductive metallic substance such as copper or the like as are the corresponding elements in the previously described modification and should be thin to minimize eddy currents.

The guard means of this form of the invention also includes a guard ring 321 which is suitably mounted on the inner surface of member 316 and is interconnected with shield means 319 of electrical lead 322. The guard ring 321 and the associated detecting electrode 317 may be of the identical construction as members 240 and 232 previously described and illustrated in FIG. 2.

The shield means 319 and 320 are mounted on the outer surface of member 316 and are in turn surrounded by a generally cylindrical member 324 which may be of a suitable dielectric material similar to that of member 316.

It should be understood that the components hereinbefore described in connection with FIG. 4 are associated with a suitable means for generating an alternating magnetic field similar to the arrangement shown in FIG. 1, this field being indicated schematically by the symbol B in FIG. 4.

An electrical lead 326 is connected with detecting electrode 317 which in the present example is a relatively high impedance detecting electrode, lead 326 extending outwardly of the transducer and being connected with a contact Y.

A lead 328 is connected with detecting electrode 318 which in the configuration of FIG. 4 is a relatively low impedance detecting electrode, lead 328 extending outwardly of the transducer portion of the apparatus and being connected with an adder circuit 330, this adder circuit being of well known conventional construction. The adder circuit is in turn connected by lead 332 with a contact X.

Adder circuit 330 is further connected by lead 336 with a potentiometer 338, this potentiometer being connected by leads 340 and 342 with a reference loop 344. This reference loop is similar to reference loop 275 previously described, and in the actual construction would be disposed adjacent to the transducer portion of the apparatus and within the magnetic field thereof so that the alternating magnetic field will cooperate with the reference loop to generate a voltage proportional to the magnetic field. By suitably adjusting potentiometer 338, a suitable hum compensation voltage may be impressed upon detecting electrode 318. Potentiometer 338 is adjusted so that the amount of hum compensation voltage will substantially null or cancel out the hum electromotive force developed between electrode 318 and electrode 317.

A tubular lead 348 is substantially coaxial with lead 326 and is electrically connected with the guard means portion of the present invention including shield means 319 and guard ring 321. Means 348 is connected with a lead 350 which in turn is connected with an adder circuit 352 substantially similar to the adder circuit 330 previously described and of well known construction. Adder circuit 352 is connected by lead 354 with a contact Z. It should be understood that the adder circuits 330 and 352 should be positioned so as to be outside of the magnetic field of the transducer portion of the apparatus.

Adder circuit 352 is also connected by a lead 356 with a potentiometer 358. Potentiometer 358 is connected by leads 360 and 362 with the leads 340 and 342 previously described whereby potentiometer 358 is also operatively connected with reference loop 344. Potentiometer 358 is suitably adjusted so that the hum compensation voltage impressed upon shield means 319 and guard means 321 will cancel out or substantially null the hum electromotive force developed between detecting electrode 317 and the associated guard means portions 319 and 321.

It will be understood that in the transducer shown in FIG. 4, the flow of fluid is perpendicular to the plane of the paper and that the alternating magnetic induction B is transverse to the axis of the tubular means through which the fluid flows. In the illustrated embodiment, detecting electrode 318 is at a very low impedance level relative to ground, while detecting electrode 317 is a relatively high impedance electrode. If it is desired that both detecting electrodes be operated at a high impedance level, the left-hand side of the transducer section as seen in FIG. 4 would be identical with the right-hand side, or in other words, detecting electrode 318 would be of a similar dimension to detecting electrode 317 and would be provided with a guard ring similar to guard ring 321 in association with detecting electrode 317. The over-all arrangement would then be completely symmetric. Both detecting electrodes may be maintained at a high impedance level if it is desired to employ a balanced or push-pull output system wherein the leads 326 and 328 would be connected with the inputs of a balanced or differential amplifier. For simplicity of illustration, a single-sided arrangement is shown. It will of course also be understood that the embodiment shown in FIG. 1 could be similarly modified for operation with a balanced or push-pull output system.

As illustrated in FIG. 4, the detecting electrodes and the guard ring are disposed at substantially the same radial distance from the center of the tubular means through which the fluid flows. The shield means 319 and 320 are disposed at a greater radius from the center of the tubular means and are separated from the detecting electrodes by a dielectric medium.

It should be noted that the tubular means and the associated components may have a cross-sectional configuration other than circular if so desired, the illustrated embodiment being considered preferable.

In general, the theory and concept of operation of the present invention lies in the fact that a hum electromotive force will be generated between various components of the apparatus and the high impedance detecting electrode means thereof. In the embodiment of FIG. 4 for example, two such hum electromotive forces are developed between electrodes 318 and 317, and further between guard means 319, 321 and electrode 317. The present invention contemplates impressing a hum compensation voltage on members 318, and 319, 321 so as to cancel out the hum electromotive forces so that the hum voltage sensed is very greatly reduced substantially to zero.

In more sophisticated configurations of the flowmeter, a larger number of detecting electrodes, shield means and guards and other members may be employed, and in such cases, means may be provided for impressing a hum compensation voltage upon each component of relatively low impedance which has a significant electrical admittance within the transducer to at least one of the detecting electrodes and especially to the high impedance detecting electrode.

Member 324 may further be surrounded by a ground means 366 which is in the form of an electrically conductive layer of material connected with a coaxial lead 370 which in turn is connected with ground.

The reference loop 344 as mentioned previously is placed adjacent to the tubular means, and the alternating magnetic induction through the reference loop generates a voltage which is in phase with any of the various hum electromotive forces. As illustrated in FIG. 4, the potentiometers allow one to vary the magnitude of the voltage impressed upon certain components of the transducer portion of the apparatus. In some cases, it may also be desirable to adjust the phase of the voltage generated by the reference loop, and in such instances any of a number of well known phase-shifting circuits may be employed in the electrical network.

Figure 5:
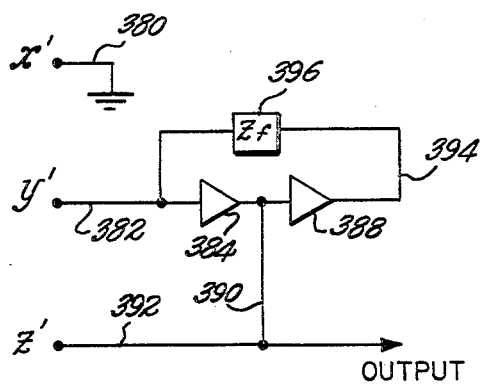
FIGURE 5 illustrates a first typical output circuit for connection with the circuit shown in FIG. 4.

Referring now to FIG. 5 of the drawings, an output circuit is illustrated, this output circuit representing one of a number of output circuits which would be suitable for use with the flowmeter apparatus illustrated in FIG. 4. In the circuit shown in FIG. 5, three contacts X', Y' and Z' are provided, it being understood that these contacts are adapted to be connected with the contacts X, Y and Z respectively as shown in FIG. 4. Contact X' as seen in FIG. 5 is connected by means of lead 380 to ground whereby it will be understood that the lead 332 from adder circuit 330 as shown in FIG. 4 will be connected with ground.

Referring again to FIG. 5, contact Y' is connected by lead 382 with the input of the first stage 384 of an amplifier means, the output of first stage 384 being connected by a lead 386 with a second stage 388 of the amplifier means. The output of the first stage 384 of the amplifier means is connected by lead 390 with a lead 392 which is in turn connected with contact Z'. Lead 392 is also connected with a suitable output means. The gain of the first stage 384 of the amplifier means is unity, and accordingly, the guard means connected with contact Z' including both the shield 319 and the guard ring 321 is driven at unit gain from the amplifier means so that substantially no potential difference due to flow generated voltage will exist between the high impedance detecting electrode 317 and the adjacent guard means thereby eliminating the effect of fringe capacity.

The output of the second stage 388 of the amplifier means is connected by a lead 394 through an impedance means 396 to the input of the first stage 384 of the amplifier means. This arrangement provides a regenerative feedback path from the output of the amplifier means to the input thereof through a feedback impedance similar to the arrangement shown in FIG. 1. With the gain setting suitably established, the detected voltage is equal to the flow generated voltage and is independent of the electrical properties of the fluid.

It should be understood that the circuit as illustrated in FIG. 5 is external of the transducer portion of the flowmeter apparatus and in general practice would be disposed at a suitable distance from the transducer portion and the magnetic field thereof. If in some instances, a stray magnetic field influences the circuit loop including the impedance 396, it may be necessary to provide additional hum compensation into this circuit loop including impedance 396, or it may be helpful to do so if an electrically symmetric or balanced flowmeter configuration is used.

Figure 6:
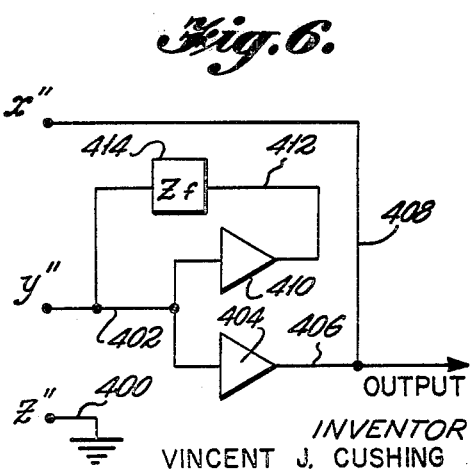
FIGURE 6 illustrates a second typical output circuit adapted to be connected with the circuit shown in FIG. 4.

Referring now to FIG. 6, a modified output circuit is illustrated and includes contacts X", Y" and Z" which are adapted to be connected with the contacts X, Y and Z respectively of FIG. 4. Contact Z" is connected by lead 400 with ground whereby the guard means of the transducer portion of the flowmeter as seen in FIG. 4 is grounded with respect to the flow generated voltage.

Contact Y" is connected by a lead 402 with a first amplifier 404 the output of which is connected through lead 406 with a suitable output means. Lead 406 is also connected with a lead 408 which in turn is connected with a contact X". With this interconnection, relatively large negative feedback is effectively provided to detecting electrode 318 of FIG. 4 which drives the detecting electrode 317 toward zero potential.

Referring again to FIG. 6, lead 402 is also connected with the input of an amplifier 410 the output of which is connected with a lead 412 which is in turn connected through a feedback impedance 414 with lead 402 as shown. Impedance means 414 may be similar to impedance means 396 previously described.

Here again, by setting the gain of amplifier 410 at a suitable level, the detecting voltage is equal to the flow generated voltage and is independent of the electrical properties of the fluid.

This output circuit also ensures that the detecting electrode 317 and the adjacent guard means including members 319 and 321 are at substantially the same flow generated potential to eliminate the effect of fringe capacity and ground capacity.

As in the output circuit of FIG. 5, means may be provided for impressing a hum compensation voltage on the circuit loop including the feedback impedance 414 if the stray magnetic field influences this circuit loop.

It should be understood that the typical output circuits as illustrated in FIGS. 5 and 6 of the drawings represent output circuits designed to provide volumetric flow rate indication during operation of the apparatus. Other suitable output circuits for providing mass flow indication may also be employed in the invention to provide effective hum compensation.

Referring now to FIGS. 7 and 8 of the drawings, a modified form of the invention is illustrated. In connection with this form of the invention, certain pertinent circuit loops are referred to, and it is important to understand the significance of this term. As used in this application, a discrete loop is a loop which is well defined everywhere by a conductor such as a loop of wire and the like. In the electromagnetic flowmeter of the present invention, the pertinent circuit loops consist partly of discrete conductors such as the wire leads to the various electrodes, and the circuit loops also partially consist of distributed portions of the circuit. In other words, the loop may include the fluid disposed within the flow conduit. The portion of the circuit loop within the metered fluid between various electrodes or conductors of the device may be called a distributed portion of the circuit loop, distributed in that the current passing between the electrodes is not confined to a discrete, well defined path as it would be in a wire, but rather the current leaves the entire surface of an electrode such as a detecting electrode and passes through the distributed or extended portions of the metered fluid to the surface area of another electrode such as a detecting electrode. In other words, the circuit loops may include discrete as well as distributed portions which are threaded by the alternating magnetic induction giving rise to so-called "transformer effect hum" which is generated whether or not the metered fluid is flowing.

If the transducer and its contents are in all respects perfectly symmetric with respect to the magnetic field, the net hum is zero, but such perfect symmetry is not attainable in practice due to fabrication tolerances, dimensional changes due to temperature, etc. In order to minimize the amount of transformer effect hum, the lead wires or lead means to the high impedance detecting electrode, low impedance detecting electrode and guard means of the apparatus shown in FIGS. 7 and 8 may lie substantially in a common vertical plane so that nominally no flux threads the circuit loops including these lead means. Where the lead means is of extended area, the centroid thereof should lie substantially in said vertical plane. Because of practical fabrication tolerances, and other conditions which may arise during operation of the apparatus, means must be provided for adjusting the lead means so as to achieve the zero flux-threading situation.

As seen in FIG. 8, the transducer means of this form of the invention is illustrated generally by reference numeral 430 and is shown in cross-section similar to the illustration of FIG. 4. A generally cylindrical tubular flow conduit means 432 is formed of dielectric material having the necessary dielectric and magnetic properties. This tubular means may be similar to those previously described. A pair of detecting electrodes 434 and 436 are provided, electrode 434 comprising a high impedance electrode and electrode 436 comprising a low impedance electrode.

It is well known in electrical practice that we can measure terminal voltage in a generator such as in an electromagnetic flowmeter, provided the external load such as the associated electrical network is high impedance. In fact, the load impedance must be many times higher than the generator's internal impedance for accuracy. Therefore, of the two terminals of the associated electrical network which are connected to the two detecting electrodes, at least one of the terminals must have a high input impedance. As the term is employed in this case, a detecting electrode which is electrically connected to a high input impedance terminal of the associated electrical network is called a high impedance detecting electrode.

Electrodes 434 and 436 are separate and electrically insulated from one another and disposed preferably at diametrically opposite inner portions of member 432. As illustrated, the detecting electrodes are suitably supported on the inner surface of member 432 and are in direct contact with fluid flowing through the tubular means. If desired, a thin layer of suitable dielectric material such as Teflon or the like may be provided inwardly of the electrodes and in concentric relationship with member 432.

The transducer portion also includes guard means including an outer shield means 440 disposed on the outer surface of member 432. This shield means as well as the detecting electrodes are formed of a suitable electrically conductive metallic substance such as copper or the like and are relatively thin to minimize eddy currents.

The guard means in this form of the invention also includes a guard ring 442 which is suitably mounted on the inner surface of member 432 and is interconnected with shield means 440 by an electrical lead 444. The guard ring and the associated high impedance detecting electrode may be of identical construction as members 240 and 232 previously described and illustrated in FIG. 2 of the drawings.

The components are associated with a suitable means for generating an alternating magnetic field similar to the arrangement previously described, this field being indicated schematically by the symbol B in FIGS. 7 and 8.

A first lead means 450 in the form of a wire or the like is interconnected with the high impedance detecting electrode 434 and is also connected with a contact Y. Lead means 450 is surrounded by a coaxial shield portion 452 which is interconnected with the shield means 440 disposed on the outer surface of member 432. In order to prevent ground loops, it is important that the amplifier end of this shielded transmission line be left unconnected; the potential on the shield (both on the transducer flow conduit 432 as well as on the shielded transmission line) should be determined at the preamplifier only with one connection, the Z terminal connection hereinafter described. A second lead means 460 in the form of a rigid lead wire is interconnected with the low impedance detecting electrode 436. Lead means 460 is brought around the upper portion of the transducer and has the terminal end 462 thereof embedded in a mechanical support means 464 suitably supported on the outer surface of the transducer. This support means may consist of a substance such as fiber glass or other insulating material which will generate no eddy currents in the alternating magnetic induction.

A terminal lead wire 466 is also embedded in the upper surface of support means 464, this terminal lead wire being connected with a contact X.

The lead means includes a relatively thin layer of conductive material 468 supported on the upper surface of support means 464. This layer of conductive material may comprise electrically conductive paint in a typical example.

This conductive layer 468 must be electrically insulated from the shield means 440 disposed on the outer surface of the transducer, and accordingly a small insulating gap 470 is provided between these conductive portions.

A second mechanical support means 480 is suitably supported by the outer portion of the transducer, and a terminal lead wire 482 is embedded in the undersurface of the support means 480, this terminal lead wire being connected with a contact Z.

A relatively thin layer of conductive material 484 similar to the conductive layer 468 is provided on the undersurface of support means 480 and is in electrical contact both with the terminal lead wire 482 and the shield means 440 provided on the outer surface of member 442.

Because of the expected amount of imperfect symmetry in the transducer which forms a circuit loop and thus generates hum voltages, it is necessary to deviate the lead means X, Y and Z so that the centroids thereof are not disposed in a common plane extending substantially parallel with the magnetic induction B, to thereby generate equal and opposite hum voltages so that the total hum voltage due to asymmetry within the transducer plus the deliberate asymmetry of the lead means X, Y and Z which may comprise the umbilical from the transducer will achieve a condition wherein the net alternating magnetic induction threading the entire loop is zero.

It is not convenient to move the high impedance lead means 450, and accordingly means is provided for deviating the lead means 468 or 484 as necessary.

Throughout almost all of the lead means to the low impedance detecting electrode, the circuit consists of a sheet conductor. Nominally, the centroid of this sheet will lie in a vertical plane (i.e., the plane of the magnetic induction B) with the lead means to the high impedance detecting electrode and the centroid of the sheet conductor to the guard means.

If it is desired to move the centroid of the layer of material 468 to the left as seen in FIG. 7, one can make a nulling cut 490 on the right side of this layer of material. The size of this nulling cut-out in the layer of material can be trimmed until the centroid of the lead is moved to the left the desired amount. If, on the other hand, it is desired to move this lead means to the right, then the nulling cut-out is made on the opposite side of the layer of conductor material 468. It is preferable that the nulling cut be made relatively close to the transducer means. Oftentimes the umbilical including the various lead means extends to a point vertically above the axis of the flow conduit so that the nulling cut can be affected by the same magnetic flux that passes through the flow conduit.

It will of course be understood that the centroid of the layer of conductive material 484 may similarly be moved from side to side by making nulling cuts therein as necessary.

The hum which shows up on the high impedance detection electrode arrives through two circuit loops: (1) the circuit loop containing the two detection electrodes, and therefore a circuit loop whose impedance depends on the relative permittivity K of the metered fluid; and (2) a circuit loop including the high impedance detection electrode and its associated guard or shield, a loop whose impedance depends very little on the metered fluid's relative permittivity K and depends mostly on the relative permittivity of the dielectric material between the high impedance detection electrode and the associated guard/shield. Because of this, the undesirable hum voltage on the high impedance detection electrode will vary as the metered fluid's relative permittivity varies. If the relative permittivity of the metered fluid remains perfectly constant, one can adjust any one of the three pertinent lead means to effect a zero hum voltage on the high impedance detection electrode; however, if thereafter the metered fluid's relative permittivity varies, the hum voltage will vary away from the desired zero value.

In order to effect a hum null which will not depend on the relative permittivity of the metered fluid, it is necessary that two of the foregoing pertinent lead means have their position independently adjusted to a proper value. Any two wires may be independently adjusted, but it is generally preferable to leave the lead means to the high impedance electrode fixed, and therefore to adjust the other two pertinent lead means. In other words, it is generally simpler to adjust the position of the wires in the umbilical leading to the low impedance detection electrode and the guard associated with the high impedance electrode. FIGURES 7 and 8 depict a configuration employing three pertinent circuit leads, and wherein two independent adjustments of the lead means may be made in order to effect a hum null that will remain nulled when the electrical properties of the metered fluid change.

Since the objective is to make two independent adjustments of the lead means so that the hum voltage remains nulled even when the relative permittivity of the metered fluid varies, the hum voltage generated in the transducer before any nulling cuts are made is measured under two conditions. Firstly, the hum voltage is measured with the metered fluid in the flow conduit, and secondly with the flow conduit empty wherein the electrical properties within the flow conduit are described by the fact that the relative permittivity K is unity. Knowing the magnitude of the raw hum voltage under these two conditions, it is possible mathematically to determine the extent of the nulling cuts to be made in the conductive layers 468 and 484 such that the hum, after the cuts are made, will remain zero with and without metered fluid in the flow conduit. When this is done, the hum will remain nulled even though the electrical properties of the metered fluid should change.

The configuration shown in FIGS. 7 and 8 is a particularly simple way of making two independent adjustments of the geometry of the two pertinent circuit loops in order to achieve a hum voltage null. Other arrangements may be employed to adjust the amount of flux which threads these two independent circuit loops. For example, instead of providing the conductive layers 468 and 484, wires might be employed throughout the full length of the lead means, and a suitable means could be provided for straining or moving these wire leads as by a mechanical screw adjustment in order to control the amount of net flux threading the circuit loops.

It should be understood that the contacts X, Y and Z may be connected with the corresponding contacts primed or double primed in the electrical network shown in FIGS. 5 and 6 respectively.

What is claimed is:

1. Magnetic flowmeter apparatus comprising a tubular means of dielectric material through which fluid is adapted to flow, means for producing an alternating magnetic field within said tubular means, detecting means adjacent said tubular means and within said magnetic field for detecting electrical signals in the fluid flowing through said tubular means, said detecting means including at least two separate detecting electrodes electrically insulated from one another, an electrical network electrically connected with said detecting electrodes, guard means including a third electrode disposed adjacent one of said detecting electrodes, said network including hum compensation means for impressing a first hum compensation voltage upon at least one of said electrodes, and means for impressing a second independent hum compensation voltage on another of said electrodes.

2. Apparatus as defined in claim 1 wherein said detecting electrodes include a relatively low impedance detecting electrode and a relatively high impedance detecting electrode, one of said hum compensation voltages being impressed upon said low impedance detecting electrode.

3. Apparatus as defined in claim 1 including means for adjusting the magnitude of one of the hum compensation voltages impressed upon one of said detecting electrodes.

4. Apparatus as defined in claim 1 wherein one of said hum compensation means includes means for generating a voltage proportional to said magnetic field.

5. Apparatus as defined in claim 1 wherein said electrical network includes an adder circuit connected with one of said detecting electrodes, one of said hum compensation voltages being impressed upon said adder circuit and thence upon said last mentioned detecting electrode.

6. Apparatus as defined in claim 1 wherein said guard means includes shield means disposed outwardly of said one detecting electrode.

7. Apparatus as defined in claim 1 wherein said guard means includes a guard ring disposed in closely spaced relationship to said one detecting electrode and substantially uniformly spaced about the outer edges of said one detecting electrode.

8. Apparatus as defined in claim 1 wherein said guard means includes shield means disposed outwardly of said one detecting electrode and a guard ring disposed in closely spaced relationship to said one detecting electrode and substantially uniformly spaced about the outer edges thereof.

9. Apparatus as defined in claim 1 wherein one of said hum compensation voltages is impressed upon said guard means, and means for adjusting the magnitude of each of the hum compensation voltages.

10. Apparatus as defined in claim 1 wherein said guard means includes shield means disposed outwardly of said one detecting electrode and a guard ring disposed in closely spaced relationship to said one detecting electrode and wherein the magnitude of each of the hum compensation voltages may be independently adjusted.

11. Apparatus as defined in claim 1 wherein at least one of said two separate detecting electrodes is a relatively high impedance detecting electrode and the other of said two separate detecting electrodes is a relatively low impedance electrode, said guard means including at least one additional low impedance electrode, said network including means for impressing one of said hum compensation voltages upon each of said low impedance electrodes, said low impedance electrodes comprising those which have an electrical admittance within the flowmeter apparatus to at least one of said first-mentioned separate detecting electrodes.

12. Apparatus as defined in claim 1 wherein at least one of said electrodes is a relatively high impedance electrode and at least another of said electrodes is a relatively low impedance electrode, said guard means being disposed adjacent said high impedance electrode, said electrical network including means for establishing substantially the same flow generated electrical potential on said high impedance electrode and the adjacent guard means.

13. Apparatus as defined in claim 12 wherein said guard means includes a shield means disposed outwardly of said one detecting electrode and a guard ring disposed in closely spaced relationship to said one detecting electrode and spaced about the outer edges of said one detecting electrode.

14. Apparatus as defined in claim 12 wherein said means for establishing substantially the same flow generated electrical potential on said high impedance electrode and the adjacent guard means comprises amplifier means connected with said high impedance electrode, and means providing unit gain positive feedback from said amplifier means to said guard means.

15. Apparatus as defined in claim 12 wherein said means for establishing substantially the same flow generated electrical potential on said high impedance electrode and the adjacent guard means comprises amplifier means connected with said high impedance electrode, and means providing a relatively large negative feedback from said amplifier means to said low impedance electrode.

References Cited

UNITED STATES PATENTS

| | | | |
|---|---|---|---|
| 2,733,604 | 2/1956 | Coulter | 73—194 |
| 3,323,364 | 6/1967 | Hunter | 73—194 |

CHARLES A. RUEHL, Primary Examiner